US012568336B2

(12) United States Patent
Ren et al.

(10) Patent No.: US 12,568,336 B2
(45) **Date of Patent: *Mar. 3, 2026**

(54) LOUDSPEAKER

(71) Applicant: AAC Microtech (Changzhou) Co., Ltd., Jiangsu (CN)

(72) Inventors: Li Ren, Changzhou (CN); Shengjie Hua, Changzhou (CN)

(73) Assignee: AAC Microtech (Changzhou) Co., Ltd., Jiangsu (CN)

( * ) Notice: Subject to any disclaimer, the term of this patent is extended or adjusted under 35 U.S.C. 154(b) by 285 days.

This patent is subject to a terminal disclaimer.

(21) Appl. No.: 18/338,375

(22) Filed: Jun. 21, 2023

(65) Prior Publication Data

US 2024/0187795 A1 Jun. 6, 2024

Related U.S. Application Data

(63) Continuation of application No. PCT/CN2022/136720, filed on Dec. 6, 2022.

(51) Int. Cl.
*H04R 9/06* (2006.01)
*H04R 7/04* (2006.01)

(52) U.S. Cl.
CPC ................ *H04R 9/06* (2013.01); *H04R 7/04* (2013.01)

(58) Field of Classification Search
CPC . H04R 9/06; H04R 9/025; H04R 7/04; H04R 31/006
See application file for complete search history.

(56) References Cited

FOREIGN PATENT DOCUMENTS

CN 209390350 U * 9/2019

* cited by examiner

*Primary Examiner* — Tuan D Nguyen
(74) *Attorney, Agent, or Firm* — Wiersch Law Group

(57) ABSTRACT

The present disclosure provides a loudspeaker including a frame, a first diaphragm, a first voice coil and a magnetic circuit system, and a first circuit board arranged between the first diaphragm and the first voice coil. The magnetic circuit system includes a magnetic yoke and a first magnet. Compared with the related technology, the loudspeaker of the present disclosure guarantees the concentricity of the frame and the first voice coil, and guarantees the reliability of the bonding between the first circuit board and the first diaphragm.

10 Claims, 4 Drawing Sheets

LOUDSPEAKER

FIELD OF THE PRESENT INVENTION

The present disclosure relates to the field of electroacoustic transducers, especially the loudspeaker which is convenient for assembly and positioning.

DESCRIPTION OF RELATED ART

The loudspeaker is used in speakers to convert audio signals into sound playback. As customers demand more from consumer electronics, the loudspeaker is given more demands.

The loudspeaker of the related art includes a frame, a vibration system fixed to the frame, a magnetic circuit system with the magnetic gap, and a circuit board. The magnetic circuit system drives the vibration system to vibrate and produce sound. The vibration system includes a diaphragm fixed on the frame, and a voice coil inserted in the magnetic gap. The magnetic circuit system includes a magnetic yoke, and a magnet arranged on the magnetic yoke. The upper end and lower end of the circuit board are glued to the voice coil and the diaphragm respectively. Since the position of the magnetic yoke blocks the voice coil and the diaphragm, when the diaphragm is finally assembled, and there is no space to press it on the front, so the gluing of the diaphragm and the circuit board cannot be guaranteed. Therefore, the assembly sequence can only be that the magnetic yoke is combined with the frame through injection molding, the magnet is assembled with the magnetic yoke, after assembled with the circuit board, the voice coil is firstly glued with the diaphragm and turned over and then assembled with the frame. The entire process cannot utilize the same fixture positioning for both the voice coil and the frame, which leads to difficulty in maintaining concentricity. Moreover, in this assembly scheme, it is necessary to increase the range of the magnetic gap, which affects performance improvement.

Therefore, it is necessary to provide a new the loudspeaker to solve the above technical problems.

SUMMARY

The present disclosure is to provide a loudspeaker with high concentricity and stable structure.

In order to achieve the objective mentioned above, the present disclosure provides a loudspeaker, including: a frame; a first diaphragm supported on the frame; a first voice coil for driving the first diaphragm to vibrate and sound; a magnetic circuit system including a magnetic yoke, and a first magnet fixed to the magnetic yoke for forming a first magnetic gap. The loudspeaker further includes a first circuit board arranged between the first diaphragm and the first voice coil, including an inner fixed end fixed to the first voice coil, a welded pad extending from said inner fixed end, a connection arm extending from the welded pad, and an outer fixed end connected with the connection arm and fixed to the frame. The magnetic yoke includes a flat board part carrying the first magnet and a folded part bent and extended from both sides of the flat board part; the first magnetic gap is formed between the folded part and the first magnet; the folded part of the magnetic yoke is provided with a first notch at the welded pad that is exposed to the first notch so that when assembling the loudspeaker, tooling can conveniently position the first circuit board and the first diaphragm.

In addition, the loudspeaker includes a second notch disposed at a position where the flat board part of the magnetic yoke is connected to the folded part; wherein the first voice coil is partially exposed to the second notch so that when assembling the loudspeaker, the tooling can conveniently position the first voice coil and the first diaphragm.

In addition, the first voice coil is rectangular, and the welded pad is positioned at a diagonal line of the first voice coil.

In addition, the folded part of the magnetic yoke includes a third notch at a position symmetrical to an axis of the first notch.

In addition, the magnetic yoke and the frame are fixed by injection molding.

In addition, the first circuit board is fixed to the first diaphragm by glue.

In addition, the magnetic circuit system further includes a first pole plate covering the first magnet.

In addition, the loudspeaker includes a second magnet fixed to the frame and arranged around the flat board part of the magnetic yoke, a second diaphragm fixed to the frame, a second voice coil for driving the second diaphragm to vibrate and sound, and a second magnetic gap formed between the second magnet and the folded part of the magnetic yoke, wherein and the second voice coil is partially inserted in the second magnetic gap.

In addition, the loudspeaker includes a second pole plate on a side of the second magnet close to the first diaphragm, and a third pole plate arranged on a side of the second magnet close to the second diaphragm.

In addition, the loudspeaker includes a second circuit board fixed at the four corners of the frame; wherein the second circuit board is electrically connected to the second voice coil.

Compared with related technologies, the loudspeaker of the present disclosure includes a frame, a first diaphragm supported on the frame, a first voice coil that drives said first diaphragm to vibrate and sound, a magnetic circuit system with the first magnetic gap, and a first circuit board arranged between the first diaphragm and the first voice coil. The magnetic circuit system includes a magnetic yoke, and a first magnet fixed to the magnetic yoke. The first circuit board includes an inner fixed end fixed to the first voice coil, a welded pad extending from said inner fixed end, a connection arm extending from the welded pad, and an outer fixed end connected with the connection arm and fixed to the frame.

The magnetic yoke includes a flat board part carrying the first magnet and a folded part bent and extended from both sides of the flat board part. The first magnetic gap is formed between the folded part and the first magnet. The folded part of the magnetic yoke is provided with a first notch at the welded pad. The welded pad is exposed to the first notch, so that when assembling the loudspeaker, tooling can conveniently position the first circuit board and the first diaphragm. The magnetic yoke of the present disclosure is arranged with a first notch as an avoidance at a position in front surface, and the assembly sequence can be adjusted as follows:

The magnetic yoke is combined with the frame by injection molding, the first magnet is assembled with the magnetic yoke. After the first voice coil is assembled with the first circuit board, the frame is flipped onto the positioning insert member of the first voice coil. The same positioning tool is used to ensure the concentricity of the frame and the first voice coil. The gluing member of the first diaphragm is assembled with the frame and the gluing member of the first voice coil. The reliability of the bonding of the first circuit board and the diaphragm is guaranteed by pressing the position of the first notch. In this solution, the magnetic gap can be further reduced to increase the SPL.

BRIEF DESCRIPTION OF THE DRAWINGS

Many aspects of the exemplary embodiment can be better understood with reference to the following drawing. The components in the drawing are not necessarily drawn to scale, the emphasis instead being placed upon clearly illustrating the principles of the present invention. Moreover, in the drawings, like reference numerals designate corresponding parts throughout the several views.

DETAILED DESCRIPTION OF THE EXEMPLARY EMBODIMENTS

The present invention will hereinafter be described in detail with reference to exemplary embodiments. To make the technical problems to be solved, technical solutions and beneficial effects of the present invention more apparent, the present invention is described in further detail together with the figures and the embodiments. It should be understood the specific embodiments described hereby is only to explain the disclosure, not intended to limit the disclosure.

Figure 1:
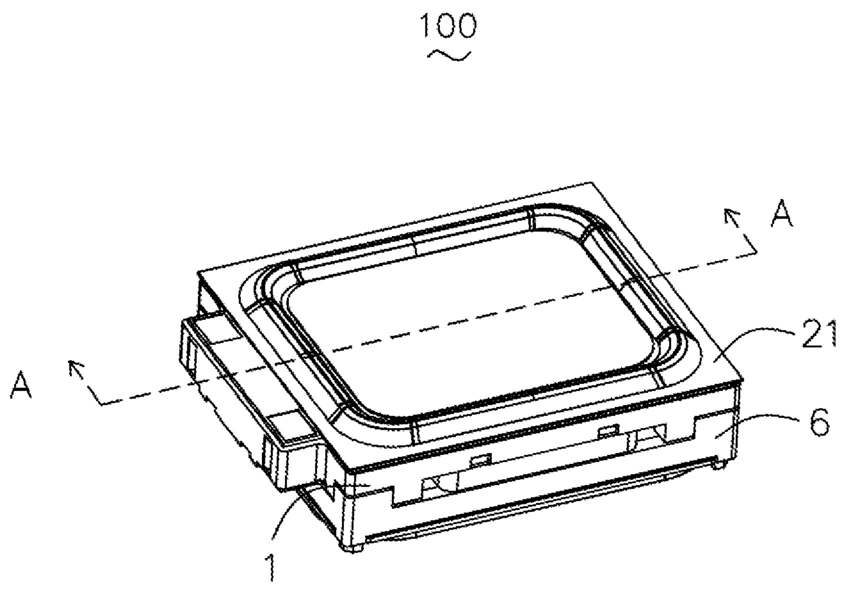
FIG. 1 is an isometric view of a loudspeaker of an embodiment of the present disclosure.
Figure 2:
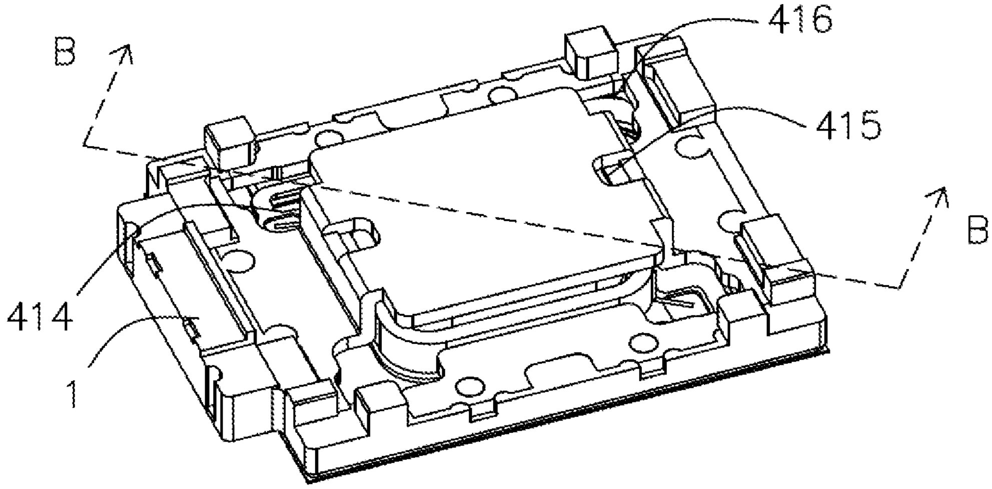
FIG. 2 is an isometric view of some components of the loudspeaker as shown in FIG. 1.
Figure 3:
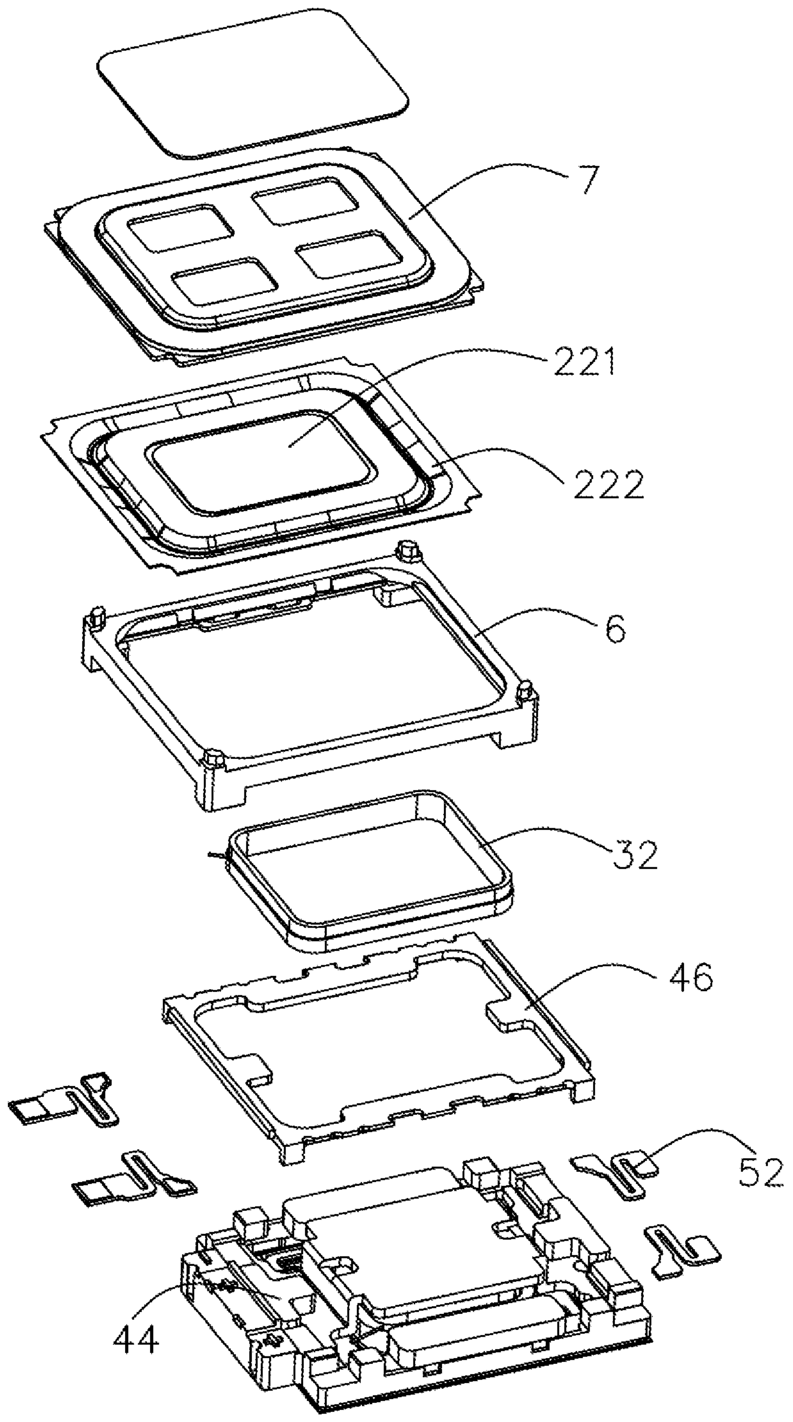
FIG. 3 is a partially exploded view of the loudspeaker shown in FIG. 1.
Figure 4:
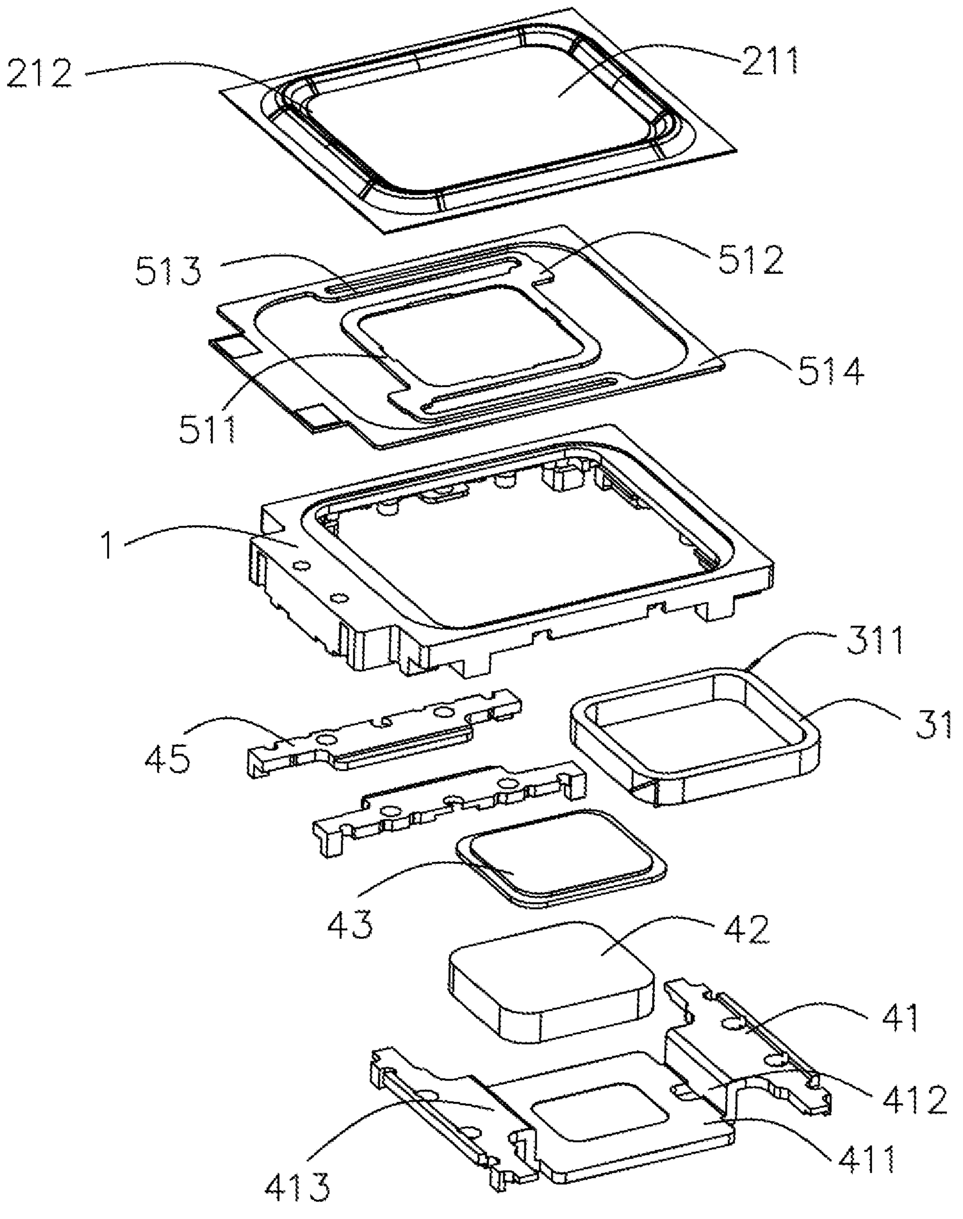
FIG. 4 is an exploded view of some components of the loudspeaker shown in FIG. 2.
Figure 5:
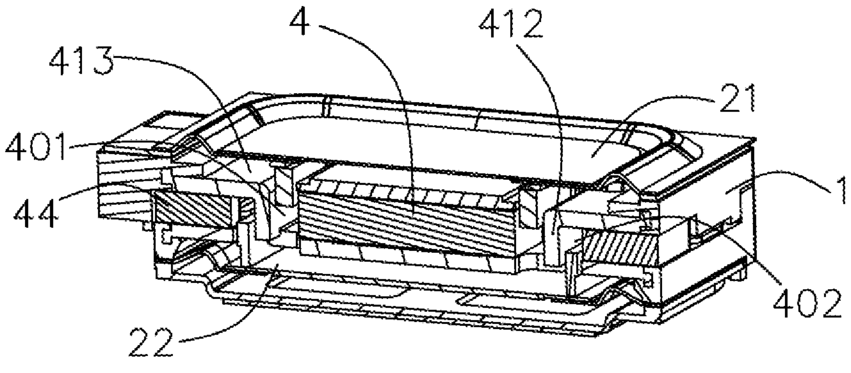
FIG. 5 is a cross-sectional view of the loudspeaker taken along line AA in FIG. 1.
Figure 6:
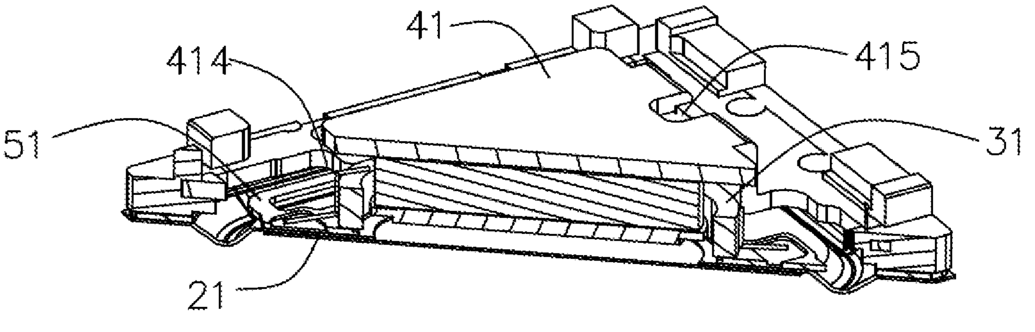
FIG. 6 is a cross-sectional view of the loudspeaker taken along line BB in FIG. 2.

Please refer to FIGS. 1-6, the present disclosure provides a loudspeaker 100, which includes a frame 1, a first diaphragm 21 supported on the frame 1, a first voice coil 31 that drives the first diaphragm 21 to vibrate and sound, a magnetic circuit system 4 with the first magnetic gap 401, and a first circuit board 51 arranged between the first diaphragm 21 and the first voice coil 31. The frame 1 is a rectangular ring-shaped hollow structure.

The first diaphragm 21 includes a first spherical dome 211 and a first folded ring 212 surrounding the first spherical dome 211.

The first voice coil 31 is rectangular, and the first leading wire 311 is provided at the position of the diagonal line of the first voice coil 31.

The magnetic circuit system 4 includes a magnetic yoke 41, a first magnet 42 fixed on the magnetic yoke 41 and a first pole plate 43 covering the first magnet 42. The magnetic yoke 41 includes a flat board part 411 that carries the first magnet 42, a folded part 412 extending from both sides of the flat board part 411, and an extension part 413 bent from the folded part 412 and extending horizontally. The extension part 413 is fixed to the frame 1. The first magnetic gap 401 is formed between the folded part 412 and the first magnet 42. The first voice coil 31 is partially inserted in the first magnetic gap 401.

The first circuit board 51 includes an inner fixed end 511 fixed to the first voice coil 31, a welded pad 512 extending from the inner fixed end 511, a connection arm 513 extending from the welded pad 512, and an outer fixed end 514 connected with the connection arm 513 and fixed to the frame 1. The welded pad 512 is positioned at the diagonal line position of the first voice coil 31, which is convenient to weld and fix with the first leading wire 311 to realize the electrical connection between the first circuit board 51 and the first voice coil 31. The first circuit board 51 is glued and fixed to the first diaphragm 21, and elastically supports the first voice coil 31.

The magnetic yoke 41 and the frame 1 are fixed by injection molding. The folded part 412 of the magnetic yoke 41 is provided with a first notch 414 at the welded pad 512. The welded pad 512 is exposed to the first notch 414, so that when assembling the loudspeaker 100, the tooling can conveniently position the first circuit board 51 and the first diaphragm 21. A second notch 415 is provided at the position where the flat board part 411 of the magnetic yoke 41 is connected to the folded part 412. The first voice coil 31 is partially exposed to the second notch 415 so that when the loudspeaker 100 is assembled, the tool can conveniently position the first voice coil 31 and the first diaphragm 21. A third notch 416 is provided at a position where the folded part 412 of the magnetic yoke 41 is axisymmetric to the first notch 414. By setting it up in this way, the magnetic yoke 41 is an overall symmetrical structure, making it easier for manufacturing and installation. The third notch 416 is set at another diagonal line position of the first voice coil 31.

The loudspeaker 100 also includes a frame 6 stacked on the frame 1, a second diaphragm 22 fixed to the frame 6, a second voice coil 32 that drives the second diaphragm 22 to vibrate and sound, a second magnet 44 fixed on the frame 1 and set around the flat board part 411 of the magnetic yoke 41, a second pole plate 45 arranged on the side of the second magnet 44 close to the first diaphragm 21, a third pole plate 46 arranged on the side of the second magnet 44 close to the second diaphragm 22, a second circuit board 52 fixed at the four corners of the frame 1, and a cover plate 7 covering the second diaphragm 22. The number of the second magnet 44 is four, a second magnetic gap 402 is formed between the second magnet 44 and the folded part 412 of the magnetic yoke 41. The extension part 413 of the magnetic yoke 41 is fixed above the second magnet 44. The second pole plate 45 is set on the second magnet 44 which is not fixed with the extension part 413, in this embodiment, it is on the second magnet 44 on the long axis direction.

The second diaphragm 22 includes a second spherical dome 221 and a second folded ring 222 surrounding the second spherical dome 211.

The second circuit board 52 is electrically connected to the second voice coil 32.

When assembling the loudspeaker 100, the frame 1, the magnetic yoke 41, and the second pole plate 45 are fixed by injection molding, and the extension part 413 of the magnetic yoke 41 is fixed on the short axis direction of the frame 1 by injection molding. The second pole plate 45 is fixed on the long axis direction of the frame 1 by injection molding. The first magnet 42 and the first pole plate 43 are fixed on the flat board part 411 of the magnetic yoke 41. At the same time, the first voice coil 31 is glued and fixed to the first circuit board 51, and the frame 1 is turned over to the positioning insertion member of the voice coil. The same positioning tool is used here, and the outer fixed end 514 of the first circuit board 51 is attached and fixed to the frame 1, so that the first voice coil 31 and the frame 1 are fixed, and the first voice coil 31 Concentricity with the frame 1 is guaranteed. Finally, the first diaphragm 21 and the first circuit board 51 is fixed to complete the assembly of part of the loudspeaker. It should be noted that during the fixing process of the first diaphragm 21 and the first circuit board 51, tool will be used to press and attach the first circuit board 51 with the first diaphragm 21 through the first notch 414 on the magnetic yoke 41, and to press and attach the first voice coil 31 with the first diaphragm 21 through the second notch 415. In this way, the glued fixation among the first voice coil 31, the first diaphragm 21, and the first circuit board 51 is guaranteed. Then the second circuit board 52, and the second magnet 44, frame 6, the third pole plate 46, the second voice coil 32, the second diaphragm 22 are assembled from the other side of the frame 1, then finally the assembly of the loudspeaker 100 is completed.

Compared with related technologies, the loudspeaker of the present disclosure includes a frame, a first diaphragm supported on the frame, a first voice coil that drives said first diaphragm to vibrate and sound, a magnetic circuit system with the first magnetic gap, and a first circuit board arranged between the first diaphragm and the first voice coil. The magnetic circuit system includes a magnetic yoke, and a first magnet fixed to the magnetic yoke. The first circuit board includes an inner fixed end fixed to the first voice coil, a welded pad extending from said inner fixed end, a connection arm extending from the welded pad, and an outer fixed end connected with the connection arm and fixed to the frame. The magnetic yoke includes a flat board part carrying the first magnet and a folded part bent and extended from both sides of the flat board part. The first magnetic gap is formed between the folded part and the first magnet. The folded part of the magnetic yoke is provided with a first notch at the welded pad. The welded pad is exposed to the first notch, So that when assembling the loudspeaker, tooling can conveniently position the first circuit board and the first diaphragm. The magnetic yoke of the present disclosure is arranged with a notch for avoidance, and the assembly sequence can be adjusted as follows: The magnetic yoke is combined with the frame by injection molding, the first magnet is assembled with the magnetic yoke. After the first voice coil is assembled with the first circuit board, the frame is flipped onto the positioning insert member of the first voice coil. The same positioning tool is used to ensure the concentricity of the frame and the first voice coil. Finally, the gluing member of the first diaphragm is assembled with the frame and the gluing member of the first voice coil. The notch is pressed to ensure the reliability of the bonding between the first circuit board and the diaphragm. In this solution, the magnetic gap can be further reduced to increase the SPL.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A loudspeaker, including:
a frame;
a first diaphragm supported on the frame;
a first voice coil for driving the first diaphragm to vibrate and sound;
a magnetic circuit system including a magnetic yoke, and a first magnet fixed to the magnetic yoke for forming a first magnetic gap;
a first circuit board arranged between the first diaphragm and the first voice coil, including an inner fixed end fixed to the first voice coil, a welded pad extending from said inner fixed end, a connection arm extending from the welded pad, and an outer fixed end connected with the connection arm and fixed to the frame; wherein
the magnetic yoke includes a flat board part carrying the first magnet and a folded part bent and extended from both sides of the flat board part; the first magnetic gap is formed between the folded part and the first magnet; the folded part of the magnetic yoke is provided with a first notch at the welded pad that is exposed to the first notch so that when assembling the loudspeaker, tooling can conveniently position the first circuit board and the first diaphragm.

2. The loudspeaker as described in claim 1 including a second notch disposed at a position where the flat board part of the magnetic yoke is connected to the folded part; wherein the first voice coil is partially exposed to the second notch so that when assembling the loudspeaker, the tooling can conveniently position the first voice coil and the first diaphragm.

3. The loudspeaker as described in claim 2, wherein, the first voice coil is rectangular, and the welded pad is positioned at a diagonal line of the first voice coil.

4. The loudspeaker as described in claim 3, wherein, the folded part of the magnetic yoke includes a third notch at a position symmetrical to an axis of the first notch.

5. The loudspeaker as described in claim 2, wherein, the magnetic yoke and the frame are fixed by injection molding.

6. The loudspeaker as described in claim 2, wherein, the first circuit board is fixed to the first diaphragm by glue.

7. The loudspeaker as described in claim 1, wherein, the magnetic circuit system further includes a first pole plate covering the first magnet.

8. The loudspeaker as described in claim 1 further including a second magnet fixed to the frame and arranged around the flat board part of the magnetic yoke, a second diaphragm fixed to the frame, a second voice coil for driving the second diaphragm to vibrate and sound, and a second magnetic gap formed between the second magnet and the folded part of the magnetic yoke, wherein and the second voice coil is partially inserted in the second magnetic gap.

9. The loudspeaker as described in claim 8 further including a second pole plate on a side of the second magnet close to the first diaphragm, and a third pole plate arranged on a side of the second magnet close to the second diaphragm.

10. The loudspeaker as described in claim 9 further including a second circuit board fixed at the four corners of the frame; wherein the second circuit board is electrically connected to the second voice coil.

* * * * *